United States Patent
Kanneath Abraham et al.

(10) Patent No.: US 12,402,195 B2
(45) Date of Patent: Aug. 26, 2025

(54) ESTABLISHING MULTIPLE NON-ACCESS STRATUM CONNECTIONS OVER A SINGLE RADIO RESOURCE CONTROL CONNECTION

(71) Applicant: Nokia Technologies Oy, Espoo (FI)

(72) Inventors: Aby Kanneath Abraham, Muvattupuzha (IN); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 362 days.

(21) Appl. No.: 18/247,345

(22) PCT Filed: Oct. 5, 2021

(86) PCT No.: PCT/FI2021/050656
§ 371 (c)(1),
(2) Date: Mar. 30, 2023

(87) PCT Pub. No.: WO2022/074292
PCT Pub. Date: Apr. 14, 2022

(65) Prior Publication Data
US 2024/0008127 A1    Jan. 4, 2024

(30) Foreign Application Priority Data
Oct. 6, 2020 (FI) .................................. 20205975

(51) Int. Cl.
*H04W 4/02*     (2018.01)
*H04W 8/18*     (2009.01)
(Continued)

(52) U.S. Cl.
CPC ........... *H04W 76/20* (2018.02); *H04W 8/183* (2013.01); *H04W 76/10* (2018.02)

(58) Field of Classification Search
CPC ..... H04W 76/20; H04W 76/10; H04W 76/27; H04W 8/183; H04W 4/60; H04W 76/15; H04W 88/06
(Continued)

(56) References Cited

U.S. PATENT DOCUMENTS 10,034,324 B2   7/2018   Ramkumar et al.
10,244,501 B2   3/2019   Miao et al.
(Continued)

FOREIGN PATENT DOCUMENTS

EP         4156849 A1      3/2023
WO    2015/179162 A1    11/2015
(Continued)

OTHER PUBLICATIONS

IP.com search history (Year: 2025).*
(Continued)

*Primary Examiner* — Moustapha Diaby
(74) *Attorney, Agent, or Firm* — Carter, DeLuca & Farrell LLP

(57) ABSTRACT

Disclosed is a method comprising transmitting a request for establishing a second non-access stratum connection for a second universal subscriber identity module, wherein the request is transmitted via a radio resource control connection associated with a pre-existing first non-access stratum connection for a first universal subscriber identity module. A first radio resource control reconfiguration message is received indicating one or more data radio bearers to be configured. The one or more data radio bearers are configured for the second universal subscriber identity module. A first radio resource control reconfiguration complete message is transmitted indicating that the first radio resource control reconfiguration is completed.

9 Claims, 12 Drawing Sheets

(51) Int. Cl.
*H04W 76/10* (2018.01)
*H04W 76/20* (2018.01)
*H04W 88/02* (2009.01)
*H04W 88/06* (2009.01)
*H04W 92/02* (2009.01)

(58) Field of Classification Search
USPC .................................................. 455/422.1
See application file for complete search history.

(56) References Cited

U.S. PATENT DOCUMENTS

| | | |
|---|---|---|
| 2016/0219421 A1 | 7/2016 | Shi et al. |
| 2016/0286600 A1 | 9/2016 | Faccin et al. |
| 2017/0150545 A1 | 5/2017 | Ramkumar et al. |
| 2019/0268766 A1 | 8/2019 | Luft et al. |
| 2020/0037380 A1 | 1/2020 | Qiu et al. |
| 2022/0053586 A1* | 2/2022 | Purkayastha ......... H04W 76/11 |
| 2023/0112588 A1* | 4/2023 | Zhu ....................... H04W 60/04 370/329 |

FOREIGN PATENT DOCUMENTS

| | | |
|---|---|---|
| WO | 2019/245256 A1 | 12/2019 |
| WO | 2020/045952 A1 | 3/2020 |
| WO | 2020/071536 A1 | 4/2020 |
| WO | 2020/137238 A1 | 7/2020 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Services and System Aspects; Security architecture and procedures for 5G system (Release 16)", 3GPP TS 33.501, V16.2.0, Mar. 2020, pp. 1-227.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

Pathak et al., "Efficient Protocol for Performance Enhancement of B4G and 5G Networks for MultiSIM Deployment", 16th IEEE Annual Consumer Communications & Networking Conference (CONC), Jan. 11-14, 2019, 7 pages.

Office action received for corresponding Finnish U.S. Appl. No. 20/205,975, dated Dec. 17, 2020, 7 pages. .

Office action received for corresponding Finnish U.S. Appl. No. 20/205,975, dated May 12, 2021, 2 pages.

International Search Report and Written Opinion received for corresponding Patent Cooperation Treaty Application No. PCT/FI2021/050656, dated Dec. 10, 2021, 17 pages.

"3rd Generation Partnership Project; Technical Specification Group Services and System Aspects; Study on system enablers for devices having multiple Universal Subscriber Identity Modules (USIM) (Release 17)", 3GPP TR 23.761, V1.0.0, Sep. 2020, pp. 1-104.

"KI #2, New Sol: MT service delivery when multiple USIMs are registered in the same serving PLMN", 3GPP TSG-SA WG2 Meeting #140 E (e-meeting), S2-2006020, Agenda: 8.10, Lenovo, Aug. 19-Sep. 2, 2020, pp. 1-6.

Office action received for corresponding Japanese Patent Application No. 2023-521288, dated May 7, 2024, 4 pages of office action and 7 pages of translation/summary available.

Extended European Search Report received for corresponding European Patent Application No. 21877062.6, dated Oct. 9, 2024, 11 pages.

"LTE Conditional HO design considerations", 3GPP TSG-RAN WG2 Meeting #106, R2-1906375, Agenda: 12.3.3.1, Qualcomm Incorporated, May 13-17, 2019, 8 pages.

* cited by examiner

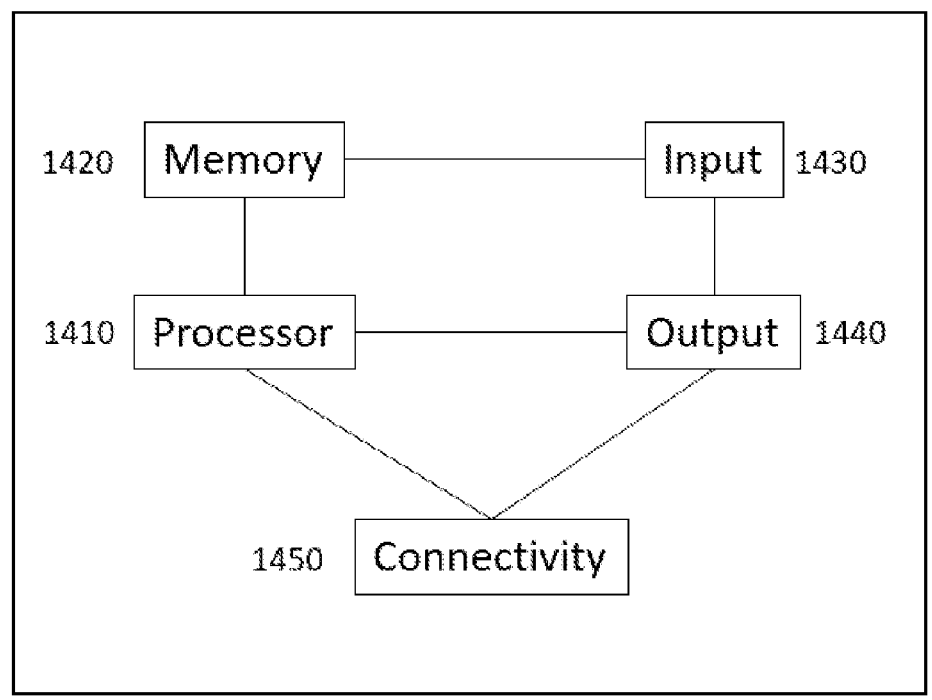

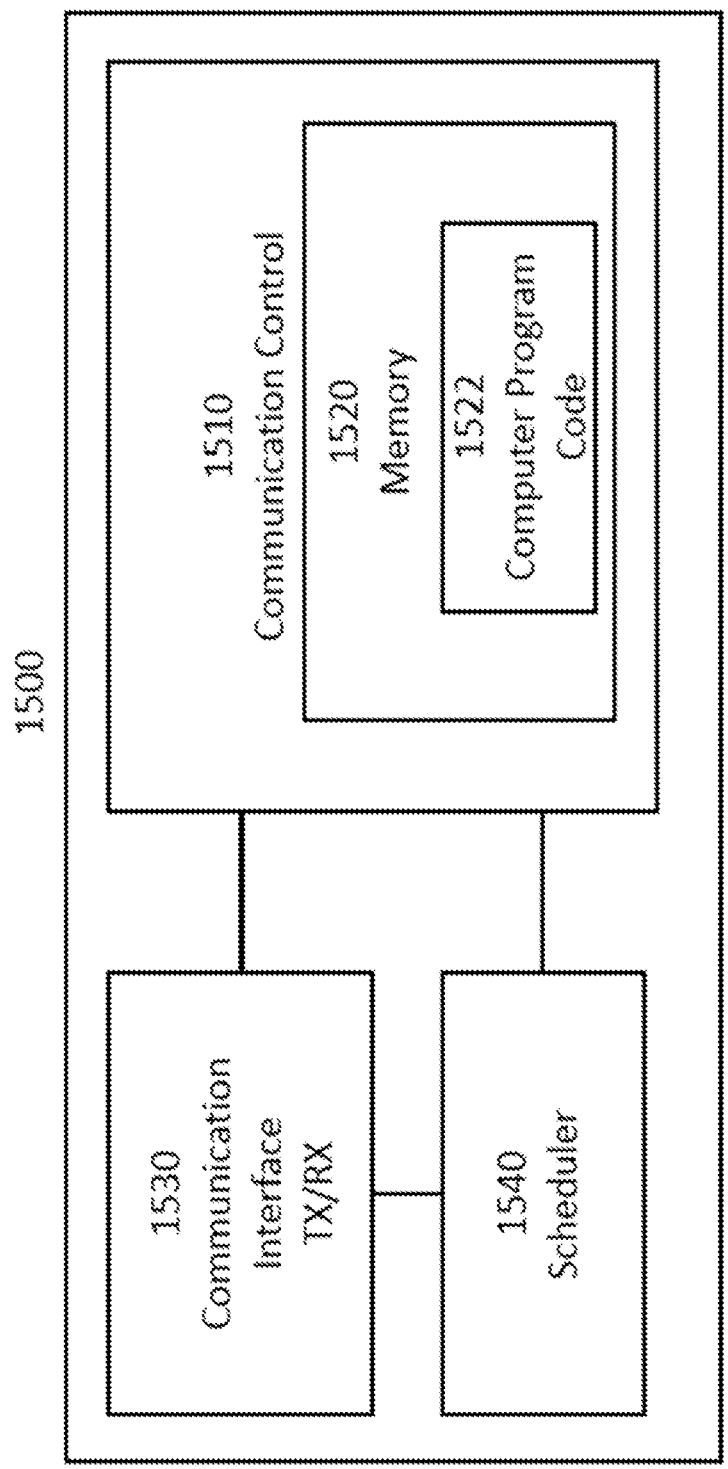

ESTABLISHING MULTIPLE NON-ACCESS STRATUM CONNECTIONS OVER A SINGLE RADIO RESOURCE CONTROL CONNECTION

RELATED APPLICATION

This application was originally filed as PCT Application No. PCT/FI2021/050656, filed on Oct. 5, 2021, which claims priority from Finnish Application No. 20205975, filed on Oct. 6, 2020, each of which is incorporated herein by reference in its entirety.

FIELD

The following exemplary embodiments relate to wireless communication.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to another aspect, there is provided an apparatus comprising means for: transmitting, to a base station, a request for establishing a second non-access stratum connection for a second universal subscriber identity module, wherein the request is transmitted via a radio resource control connection associated with a pre-existing first non-access stratum connection for a first universal subscriber identity module; receiving, from the base station, a first radio resource control reconfiguration message indicating one or more data radio bearers to be configured, wherein the first radio resource control reconfiguration message is received via the radio resource control connection; configuring the one or more data radio bearers for the second universal subscriber identity module; and transmitting, to the base station, a first radio resource control reconfiguration complete message indicating that the first radio resource control reconfiguration is completed.

According to an aspect, there is provided an apparatus comprising at least one processor, and at least one memory including computer program code, wherein the at least one memory and the computer program code are configured, with the at least one processor, to cause the apparatus to: transmit, to a base station, a request for establishing a second non-access stratum connection for a second universal subscriber identity module, wherein the request is transmitted via a radio resource control connection associated with a pre-existing first non-access stratum connection for a first universal subscriber identity module; receive, from the base station, a first radio resource control reconfiguration message indicating one or more data radio bearers to be configured, wherein the first radio resource control reconfiguration message is received via the radio resource control connection; configure the one or more data radio for the second universal subscriber identity module; and transmit, to the base station, a first radio resource control reconfiguration complete message indicating that the first radio resource control reconfiguration is completed.

According to another aspect, there is provided a method comprising transmitting, to a base station, a request for establishing a second non-access stratum connection for a second universal subscriber identity module, wherein the request is transmitted via a radio resource control connection associated with a pre-existing first non-access stratum connection for a first universal subscriber identity module; receiving, from the base station, a first radio resource control reconfiguration message indicating one or more data radio bearers to be configured, wherein the first radio resource control reconfiguration message is received via the radio resource control connection; configuring the one or more data radio bearers for the second universal subscriber identity module; and transmitting, to the base station, a first radio resource control reconfiguration complete message indicating that the first radio resource control reconfiguration is completed.

According to another aspect, there is provided a computer program comprising instructions for causing an apparatus to perform at least the following: transmit, to a base station, a request for establishing a second non-access stratum connection for a second universal subscriber identity module, wherein the request is transmitted via a radio resource control connection associated with a pre-existing first non-access stratum connection for a first universal subscriber identity module; receive, from the base station, a first radio resource control reconfiguration message indicating one or more data radio bearers to be configured, wherein the first radio resource control reconfiguration message is received via the radio resource control connection; configure the one or more data radio bearers for the second universal subscriber identity module; and transmit, to the base station, a first radio resource control reconfiguration complete message indicating that the first radio resource control reconfiguration is completed.

According to another aspect, there is provided a computer readable medium comprising program instructions for causing an apparatus to perform at least the following: transmit, to a base station, a request for establishing a second non-access stratum connection for a second universal subscriber identity module, wherein the request is transmitted via a radio resource control connection associated with a pre-existing first non-access stratum connection for a first universal subscriber identity module; receive, from the base station, a first radio resource control reconfiguration message indicating one or more data radio bearers to be configured, wherein the first radio resource control reconfiguration message is received via the radio resource control connection; configure the one or more data radio bearers for the second universal subscriber identity module; and transmit, to the base station, a first radio resource control reconfiguration complete message indicating that the first radio resource control reconfiguration is completed.

According to another aspect, there is provided a non-transitory computer readable medium comprising program instructions for causing an apparatus to perform at least the following: transmit, to a base station, a request for establishing a second non-access stratum connection for a second universal subscriber identity module, wherein the request is transmitted via a radio resource control connection associated with a pre-existing first non-access stratum connection for a first universal subscriber identity module; receive, from the base station, a first radio resource control reconfiguration message indicating one or more data radio bearers to be configured, wherein the first radio resource control reconfiguration message is received via the radio resource control connection; configure the one or more data radio bearers for the second universal subscriber identity module; and transmit, to the base station, a first radio resource control reconfiguration complete message indicating that the first radio resource control reconfiguration is completed.

According to another aspect, there is provided an apparatus comprising means for: receiving, from a terminal device, a request for establishing a second non-access stratum connection from a second universal subscriber identity module comprised in the terminal device, wherein the request is received via a radio resource control connection associated with a pre-existing first non-access stratum connection from a first universal subscriber identity module comprised in the terminal device; transmitting, to an access and mobility management function, the request for establishing the second non-access stratum connection; receiving, from the access and mobility management function, an initial context setup request indicating an acceptance for establishing the second non-access stratum connection; creating one or more data radio bearers associated with the second universal subscriber identity module; transmitting, to the terminal device, a first radio resource control reconfiguration message indicating the one or more data radio bearers to be configured, wherein the first radio resource control reconfiguration message is transmitted via the radio resource control connection; receiving, from the terminal device, a first radio resource control reconfiguration complete message indicating that the first radio resource control reconfiguration is completed; and transmitting, to the access and mobility management function, an initial context setup response indicating that the second non-access stratum connection is established.

According to an aspect, there is provided an apparatus comprising at least one processor, and at least one memory including computer program code, wherein the at least one memory and the computer program code are configured, with the at least one processor, to cause the apparatus to: receive, from a terminal device, a request for establishing a second non-access stratum connection from a second universal subscriber identity module comprised in the terminal device, wherein the request is received via a radio resource control connection associated with a pre-existing first non-access stratum connection from a first universal subscriber identity module comprised in the terminal device; transmit, to an access and mobility management function, the request for establishing the second non-access stratum connection; receive, from the access and mobility management function, an initial context setup request indicating an acceptance for establishing the second non-access stratum connection; create one or more data radio bearers associated with the second universal subscriber identity module; transmit, to the terminal device, a first radio resource control reconfiguration message indicating the one or more data radio bearers to be configured, wherein the first radio resource control reconfiguration message is transmitted via the radio resource control connection; receive, from the terminal device, a first radio resource control reconfiguration complete message indicating that the first radio resource control reconfiguration is completed; and transmit, to the access and mobility management function, an initial context setup response indicating that the second non-access stratum connection is established.

According to another aspect, there is provided a method comprising receiving, from a terminal device, a request for establishing a second non-access stratum connection from a second universal subscriber identity module comprised in the terminal device, wherein the request is received via a radio resource control connection associated with a pre-existing first non-access stratum connection from a first universal subscriber identity module comprised in the terminal device; transmitting, to an access and mobility management function, the request for establishing the second non-access stratum connection; receiving, from the access and mobility management function, an initial context setup request indicating an acceptance for establishing the second non-access stratum connection; creating one or more data radio bearers associated with the second universal subscriber identity module; transmitting, to the terminal device, a first radio resource control reconfiguration message indicating the one or more data radio bearers to be configured, wherein the first radio resource control reconfiguration message is transmitted via the radio resource control connection; receiving, from the terminal device, a first radio resource control reconfiguration complete message indicating that the first radio resource control reconfiguration is completed; and transmitting, to the access and mobility management function, an initial context setup response indicating that the second non-access stratum connection is established.

According to another aspect, there is provided a computer program comprising instructions for causing an apparatus to perform at least the following: receive, from a terminal device, a request for establishing a second non-access stratum connection from a second universal subscriber identity module comprised in the terminal device, wherein the request is received via a radio resource control connection associated with a pre-existing first non-access stratum connection from a first universal subscriber identity module comprised in the terminal device; transmit, to an access and mobility management function, the request for establishing the second non-access stratum connection; receive, from the access and mobility management function, an initial context setup request indicating an acceptance for establishing the second non-access stratum connection; create one or more data radio bearers associated with the second universal subscriber identity module; transmit, to the terminal device, a first radio resource control reconfiguration message indicating the one or more data radio bearers to be configured, wherein the first radio resource control reconfiguration message is transmitted via the radio resource control connection; receive, from the terminal device, a first radio resource control reconfiguration complete message indicating that the first radio resource control reconfiguration is completed; and transmit, to the access and mobility management function, an initial context setup response indicating that the second non-access stratum connection is established.

According to another aspect, there is provided a computer readable medium comprising program instructions for causing an apparatus to perform at least the following: receive, from a terminal device, a request for establishing a second non-access stratum connection from a second universal subscriber identity module comprised in the terminal device, wherein the request is received via a radio resource control connection associated with a pre-existing first non-access stratum connection from a first universal subscriber identity module comprised in the terminal device; transmit, to an access and mobility management function, the request for establishing the second non-access stratum connection; receive, from the access and mobility management function, an initial context setup request indicating an acceptance for establishing the second non-access stratum connection; create one or more data radio bearers associated with the second universal subscriber identity module; transmit, to the terminal device, a first radio resource control reconfiguration message indicating the one or more data radio bearers to be configured, wherein the first radio resource control reconfiguration message is transmitted via the radio resource control connection; receive, from the terminal device, a first radio resource control reconfiguration complete message indicating that the first radio resource control reconfiguration is completed; and transmit, to the access and mobility management function, an initial context setup response indicating that the second non-access stratum connection is established.

According to another aspect, there is provided a non-transitory computer readable medium comprising program instructions for causing an apparatus to perform at least the following: receive, from a terminal device, a request for establishing a second non-access stratum connection from a second universal subscriber identity module comprised in the terminal device, wherein the request is received via a radio resource control connection associated with a pre-existing first non-access stratum connection from a first universal subscriber identity module comprised in the terminal device; transmit, to an access and mobility management function, the request for establishing the second non-access stratum connection; receive, from the access and mobility management function, an initial context setup request indicating an acceptance for establishing the second non-access stratum connection; create one or more data radio bearers associated with the second universal subscriber identity module; transmit, to the terminal device, a first radio resource control reconfiguration message indicating the one or more data radio bearers to be configured, wherein the first radio resource control reconfiguration message is transmitted via the radio resource control connection; receive, from the terminal device, a first radio resource control reconfiguration complete message indicating that the first radio resource control reconfiguration is completed; and transmit, to the access and mobility management function, an initial context setup response indicating that the second non-access stratum connection is established.

According to another aspect, there is provided an apparatus comprising means for: receiving, from a first base station, a request for establishing a second non-access stratum connection from a second universal subscriber identity module comprised in a terminal device; transmitting, to the first base station, an initial context setup request indicating an acceptance for establishing the second non-access stratum connection; and receiving, from the first base station, an initial context setup response indicating that the second non-access stratum connection is established.

According to an aspect, there is provided an apparatus comprising at least one processor, and at least one memory including computer program code, wherein the at least one memory and the computer program code are configured, with the at least one processor, to cause the apparatus to: receive, from a first base station, a request for establishing a second non-access stratum connection from a second universal subscriber identity module comprised in a terminal device; transmit, to the first base station, an initial context setup request indicating an acceptance for establishing the second non-access stratum connection; and receive, from the first base station, an initial context setup response indicating that the second non-access stratum connection is established.

According to another aspect, there is provided a method comprising receiving, from a first base station, a request for establishing a second non-access stratum connection from a second universal subscriber identity module comprised in a terminal device; transmitting, to the first base station, an initial context setup request indicating an acceptance for establishing the second non-access stratum connection; and receiving, from the first base station, an initial context setup response indicating that the second non-access stratum connection is established.

According to another aspect, there is provided a computer program comprising instructions for causing an apparatus to perform at least the following: receive, from a first base station, a request for establishing a second non-access stratum connection from a second universal subscriber identity module comprised in a terminal device; transmit, to the first base station, an initial context setup request indicating an acceptance for establishing the second non-access stratum connection; and receive, from the first base station, an initial context setup response indicating that the second non-access stratum connection is established.

According to another aspect, there is provided a computer readable medium comprising program instructions for causing an apparatus to perform at least the following: receive, from a first base station, a request for establishing a second non-access stratum connection from a second universal subscriber identity module comprised in a terminal device; transmit, to the first base station, an initial context setup request indicating an acceptance for establishing the second non-access stratum connection; and receive, from the first base station, an initial context setup response indicating that the second non-access stratum connection is established.

According to another aspect, there is provided a non-transitory computer readable medium comprising program instructions for causing an apparatus to perform at least the following: receive, from a first base station, a request for establishing a second non-access stratum connection from a second universal subscriber identity module comprised in a terminal device; transmit, to the first base station, an initial context setup request indicating an acceptance for establishing the second non-access stratum connection; and receive, from the first base station, an initial context setup response indicating that the second non-access stratum connection is established.

According to another aspect, there is provided a system comprising at least a terminal device, a base station and an access and mobility management function. The terminal device comprises at least means for: transmitting, to the base station, a request for establishing a second non-access stratum connection for a second universal subscriber identity module, wherein the request is transmitted via a radio resource control connection associated with a pre-existing first non-access stratum connection for a first universal subscriber identity module; receiving, from the base station, a first radio resource control reconfiguration message indicating one or more data radio bearers to be configured, wherein the first radio resource control reconfiguration message is received via the radio resource control connection; configuring the one or more data radio bearers for the second universal subscriber identity module; and transmitting, to the base station, a first radio resource control reconfiguration complete message indicating that the first radio resource control reconfiguration is completed. The base station comprises at least means for: receiving, from the terminal device, the request for establishing the second non-access stratum connection; transmitting, to the access and mobility management function, the request for establishing the second non-access stratum connection; receiving, from the access and mobility management function, an initial context setup request indicating an acceptance for establishing the second non-access stratum connection; creating the one or more data radio bearers for the second universal subscriber identity module; transmitting, to the terminal device, the first radio resource control reconfiguration message indicating the one or more data radio bearers to be configured; receiving, from the terminal device, the first radio resource control reconfiguration complete message indicating that the first radio resource control reconfiguration is completed; and transmitting, to the access and mobility management function, an initial context setup response indicating that the second non-access stratum connection is established. The access and mobility management function comprises at least means for: receiving, from the base station, the request for establishing the second non-access stratum connection; transmitting, to the base station, the initial context setup request indicating the acceptance for establishing the second non-access stratum connection; and receiving, from the first base station, the initial context setup response indicating that the second non-access stratum connection is established.

According to another aspect, there is provided a system comprising at least a terminal device, a base station and an access and mobility management function. The terminal device is configured to at least: transmit, to the base station, a request for establishing a second non-access stratum connection for a second universal subscriber identity module, wherein the request is transmitted via a radio resource control connection associated with a pre-existing first non-access stratum connection for a first universal subscriber identity module; receive, from the base station, a first radio resource control reconfiguration message indicating one or more data radio bearers to be configured, wherein the first radio resource control reconfiguration message is received via the radio resource control connection; configure the one or more data radio bearers for the second universal subscriber identity module; and transmit, to the base station, a first radio resource control reconfiguration complete message indicating that the first radio resource control reconfiguration is completed. The base station is configured to at least: receive, from the terminal device, the request for establishing the second non-access stratum connection; transmitting, to the access and mobility management function, the request for establishing the second non-access stratum connection; receive, from the access and mobility management function, an initial context setup request indicating an acceptance for establishing the second non-access stratum connection; create the one or more data radio bearers for the second universal subscriber identity module; transmit, to the terminal device, the first radio resource control reconfiguration message indicating the one or more data radio bearers to be configured; receive, from the terminal device, the first radio resource control reconfiguration complete message indicating that the first radio resource control reconfiguration is completed; and transmit, to the access and mobility management function, an initial context setup response indicating that the second non-access stratum connection is established. The access and mobility management function is configured to at least: receive, from the base station, the request for establishing the second non-access stratum connection; transmit, to the base station, the initial context setup request indicating the acceptance for establishing the second non-access stratum connection; and receive, from the first base station, the initial context setup response indicating that the second non-access stratum connection is established.

BRIEF DESCRIPTION OF THE DRAWINGS

In the following, various exemplary embodiments will be described in greater detail with reference to the accompanying drawings, in which

FIG. 13 illustrates a flow chart according to an exemplary embodiment;

FIGS. 14 and 15 illustrate apparatuses according to exemplary embodiments.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the substantially same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
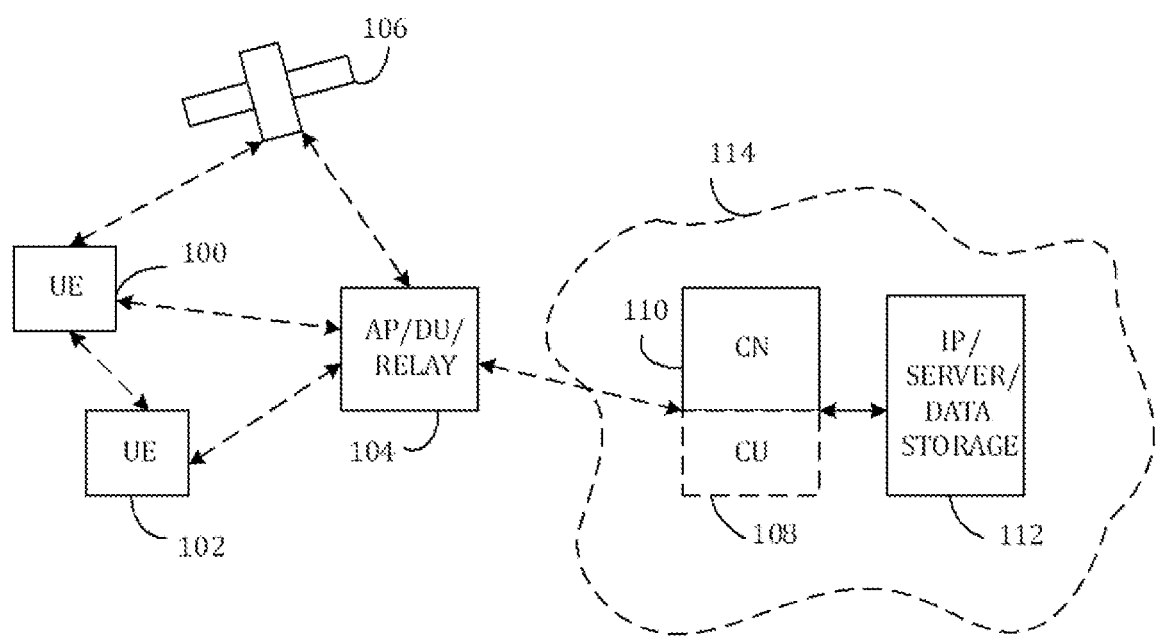
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz—cmWave, below 6 GHz—cmWave—mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a central unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

A subscriber identity module, SIM, card is an integrated circuit that may be used on terminal devices to store subscriber information for identifying and authenticating subscribers in a network. A universal integrated circuit card, UICC, is a physical card that may be used as a SIM card. The UICC may comprise, for example, a SIM application and/or a universal subscriber identity module, USIM, application. The SIM application may be used for identifying and authenticating subscribers in GSM networks, while the USIM application may be used for identifying and authenticating subscribers in other network types as well.

USIM is a software application that may store subscriber-related information and implement the security functions related to authentication and ciphering on the user side. A terminal device may support more than one USIM, wherein the multiple USIMs may be from a single mobile network operator or from different mobile network operators. Such a multi-USIM, i.e. MUSIM, device may use common radio and baseband components that are shared among the multiple USIMs. For example, while actively communicating with a first system associated with a first USIM, the terminal device may occasionally check a second system associated with a second USIM, for example to monitor the paging channel, perform signal measurements, or read the system information, and determine if it needs to respond to a paging request from the other system.

Multi-SIM devices may be used for different purposes. For example, separate USIMs may be used for home and roaming, or for office and personal purposes. They may also be used for having different plans for data and voice. With slicing, one USIM may be used for certain slices, while the other USIM may be used for other general services. A single public land mobile network, PLMN, may be used for the multiple USIMs, or the multiple USIMs may belong to different PLMNs.

Non-access stratum, NAS, is a functional layer between the core network and UE. This layer may be used to manage the establishment of communication sessions and for maintaining continuous communications with the UE as it moves. An access and mobility management function, AMF, is a functional entity in the core network that receives connection and session related information from the UE. The AMF is responsible for handling connection management and mobility management tasks, such as managing handovers between gNBs. The AMF may also implement various functions relating to security, access management, and authorization, such as NAS ciphering and integrity protection algorithms. A NAS signaling connection is a connection between the UE and AMF.

Figure 2:
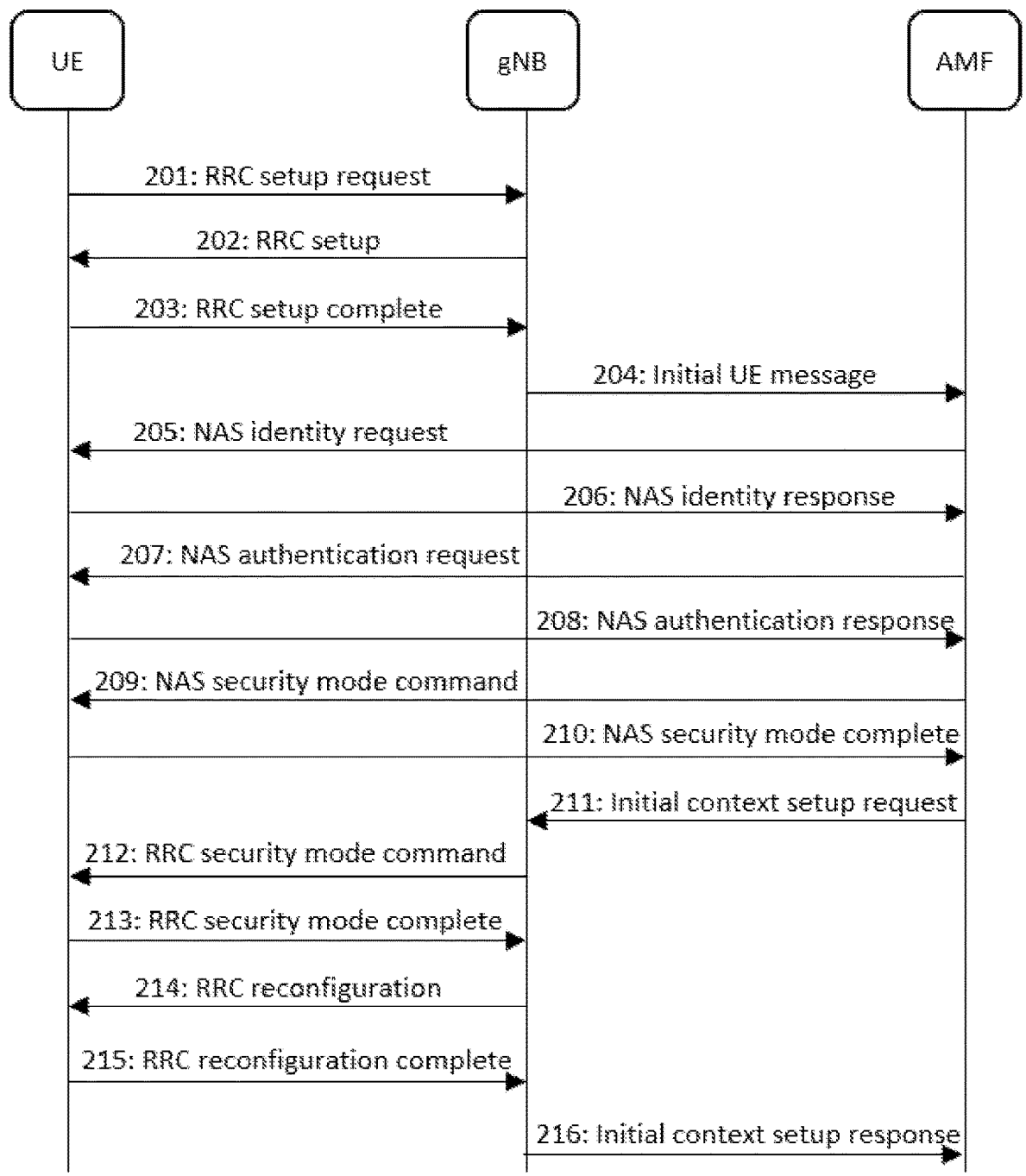
FIG. 2 illustrates signaling diagram for non-access stratum signaling connection establishment.

FIG. 2 illustrates a signaling diagram for NAS signaling connection establishment in 5G. Upon receiving a request for NAS connection establishment, the UE radio resource control, RRC, transmits 201 an RRC setup request to a base station such as a gNB, and receives 202 an RRC setup with an SRB1 configuration. SRB1 is a type of signaling radio bearer, SRB. SRB is a radio bearer that may be used for transmission of RRC and/or NAS messages. The UE transmits 203 to the gNB an RRC setup complete message comprising a NAS message, such as a registration request NAS message. The gNB selects an AMF and transmits 204 to the selected AMF an NG application protocol, NGAP, initial UE message comprising the NAS message received from the UE.

The AMF transmits 205 a NAS identity request to the UE for requesting the UE identity from the UE via a NAS message, and receives 206 a NAS identity response from the UE. The NAS identity response may comprise an identifier such as a subscription concealed identifier, SUCI, which may be derived from the public key of the home PLMN. The AMF transmits 207 a NAS authentication request to the UE for initiating an authentication procedure with the UE, and receives 208 a NAS authentication response from the UE for responding to the authentication challenge. The AMF transmits 209 a NAS security mode command to the UE for signaling the selected NAS security algorithm to the UE. In the NAS security mode command, the AMF may also request the international mobile equipment identity, IMEISV, from the UE. The AMF receives 210 a NAS security mode complete message from the UE signaling the completion of the NAS security procedure and comprising the requested IMEISV of the UE.

The AMF transmits 211 an NGAP initial context setup request to the gNB. The purpose of the initial context setup procedure may be to establish the necessary overall initial UE context at the gNB. The initial UE context may comprise, for example, protocol data unit (PDU) session context, the security key, mobility restriction list, UE radio capability, UE security capabilities, etc. The initial context setup request may comprise a registration accept NAS message.

The gNB transmits 212 an RRC security mode command to the UE for commanding the UE for the activation of access stratum, AS, security. AS is a functional layer between the radio network and UE, and it may be used for transferring data over a wireless connection and for managing radio resources. AS security may comprise the integrity protection and ciphering of SRBs and data radio bearers, DRBs. A DRB is a radio bearer that may be used to carry user data. The gNB receives 213 an RRC security mode complete message from the UE to confirm the successful completion of the security mode command.

The gNB transmits 214 an RRC reconfiguration message to the UE to reconfigure the UE with DRBs and an additional SRB. In other words, the RRC reconfiguration message may be used to modify the RRC connection. The RRC reconfiguration message may also comprise the registration accept NAS message received from the AMF. After receiving 215 an RRC reconfiguration complete message from the UE indicating the successful completion of the RRC connection reconfiguration, the gNB transmits 216 an initial context setup response to the AMF to confirm the setup of the UE context.

Figure 3:
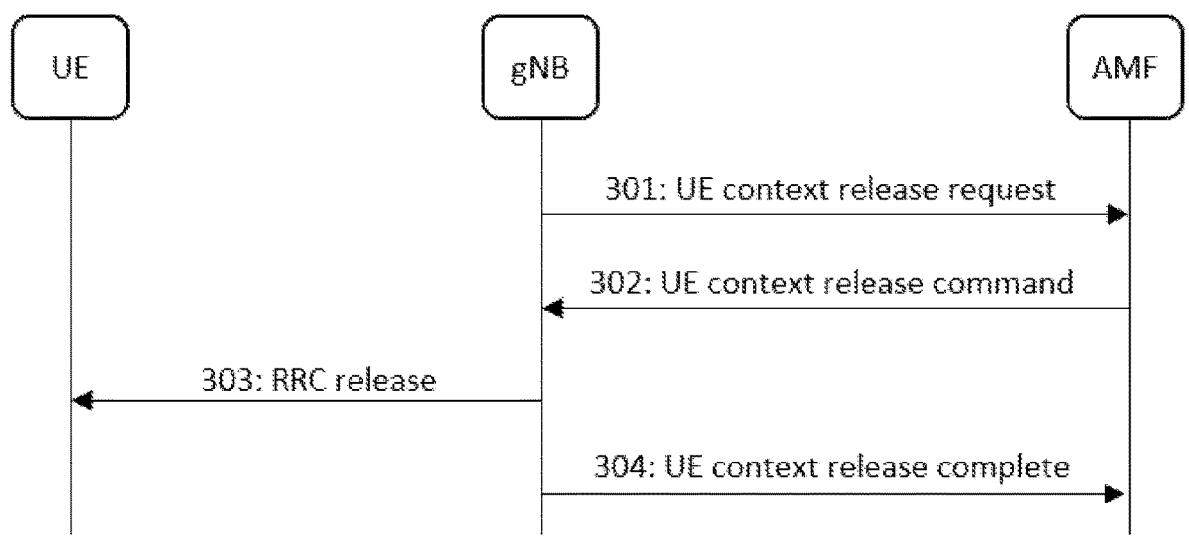
FIG. 3 illustrates a signaling diagram for a release procedure.

FIG. 3 illustrates a signaling diagram for an NG UE release procedure. Upon deciding to release the UE, the gNB transmits 301 an NGAP UE context release request to the AMF to request the release of the connection associated with the UE. The AMF transmits 302 to the gNB an NGAP UE context release command to release the UE context stored at the gNB. The AMF may also transmit the command on its own without receiving a prior release request. The gNB releases the UE by transmitting 303 an RRC release message to the UE commanding the release of the RRC connection. The gNB transmits 304 an NGAP UE context release complete message to the AMF to confirm the release of the connection associated with the UE.

When the MUSIM device comprises at least two USIMs belonging to a single PLMN, or when they are served by a single radio network supporting two different PLMNs, the UE instances of the USIMs may need to maintain a separate protocol stack, PS, instance, and also to operate independently for idle mode and connected mode operation. However, this independent operation, when sharing a single serving cell, may not be resource efficient from UE and network perspective.

For enabling simultaneous operation over a single radio link for at least two USIMs, the following problems may currently apply. Firstly, a single RRC connection may be linked to a single associated S1/NG connection. In other words, currently it may not be supported to have two S1/NG connections to the substantially same or a different AMF linked to the single RRC connection. Secondly, the security key architecture for AS security may derive the security keys for AS operation based on NAS keys, which may be linked to a single MUSIM subscription. Thirdly, resources of one RRC connection may be fully dedicated towards a single NAS connection.

Some exemplary embodiments provide a mechanism for sharing a single RRC connection between two NAS signaling connections to enable simultaneous services for the two MUSIM operations. An internal algorithm within a radio access network, RAN, may be used for key set selection for AS security from two NAS based master keys received from the two independent NAS connections. The key selection algorithm may be based on the RRC connection status of a specific USIM, and also the DRB created for a different NAS connection. Furthermore, some exemplary embodiments may provide a mechanism to prioritize resources between two NAS connections based on control from an AMF.

Figure 4:
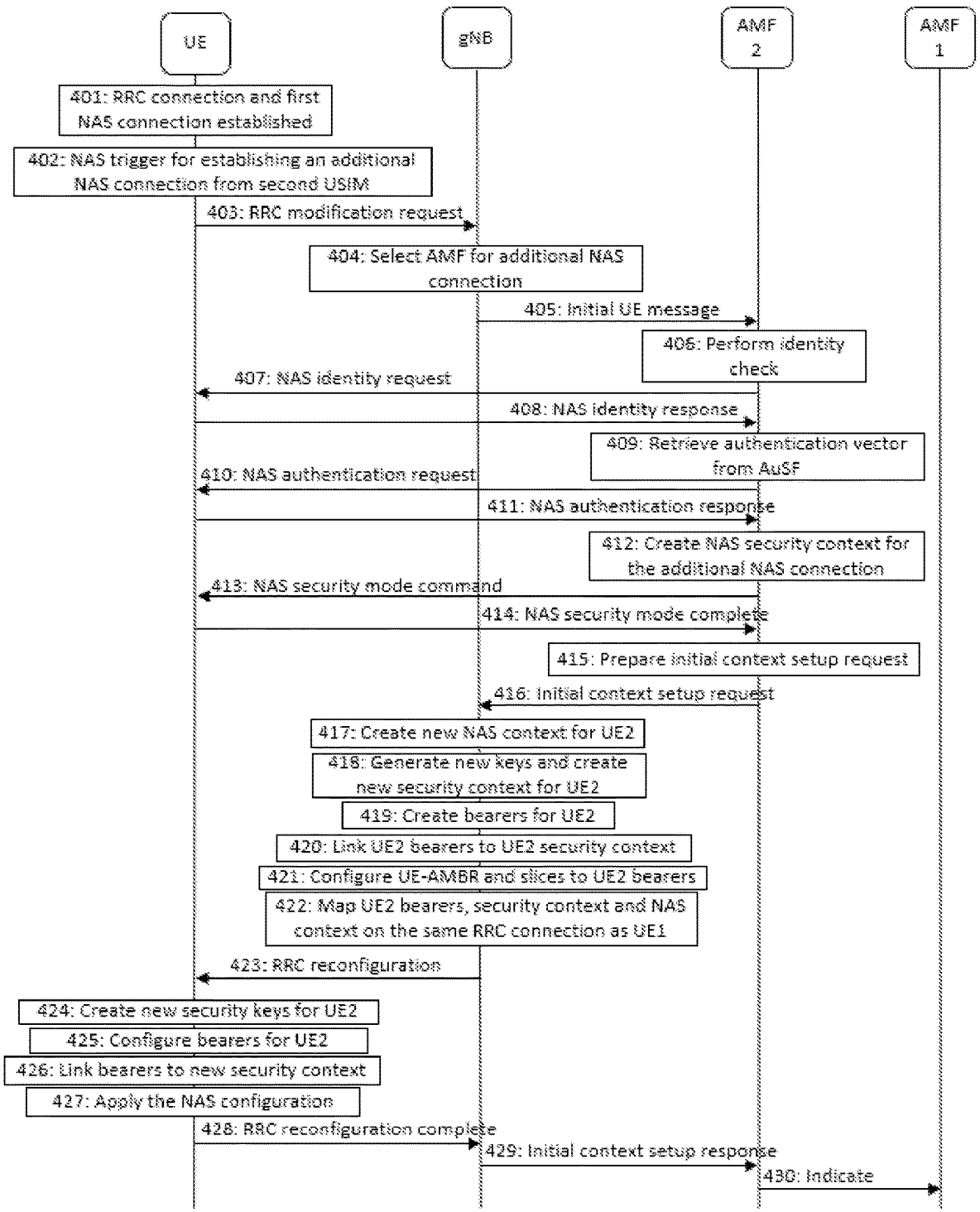
FIG. 4 illustrates a signaling diagram according to an exemplary embodiment.

FIG. 4 illustrates a signaling diagram according to an exemplary embodiment. FIG. 4 illustrates NAS signaling connection establishment through a second USIM, while the first USIM is active, for example during registration, or during service request if the UE is already registered. The exemplary embodiment illustrated in FIG. 4 may be an enhancement over the signaling connection establishment procedure illustrated in FIG. 2.

UE1 and UE2 denote the UE protocol stacks for a first USIM and a second USIM, respectively, which are comprised in the UE. The UE may be a MUSIM device. UE1 is RRC connected 401 and registered to the network. When UE2 needs an additional NAS signaling connection from the second USIM, either for a service request if it is already registered or for a new registration request, a NAS trigger 402 may be used to trigger establishing the additional NAS signaling connection, i.e. a second NAS signaling connection, on a single RRC connection shared with the first NAS signaling connection on the first USIM. In other words, more than one NAS connection may be established over a single RRC connection.

UE2 transmits 403 an RRC modification request to a base station such as a gNB indicating the additional NAS connection setup, requested network slice selection assistance information (NSSAI), NAS PDU, and/or the ID of the AMF of UE1. For example, the RRC modification request may be transmitted with cause: "additional NAS connection setup" indicating the reason for the RRC modification request. The gNB may select 404 the substantially same AMF or a different AMF for the additional NAS connection, and transmits 405 an NGAP initial UE message to the selected second AMF, denoted as AMF2. The NGAP initial UE message may indicate a request for the additional NAS signaling connection establishment, i.e. to indicate that there is already a first NAS connection active with UE1 in the UE. For example, the initial UE message may be transmitted with cause: "additional NAS signaling connection establishment". The initial UE message may further comprise the identifier of the AMF of UE1, the NAS PDU received from the UE, etc. The AMF of UE1 is denoted as AMF1 herein.

The AMF performs 406 an identity check, transmits 407 an NAS identity request to UE2, and receives 408 an NAS identity response from UE2. The AMF retrieves 409 the authentication vector from the authentication server function, AuSF. The AMF transmits 410 an NAS authentication request to UE2, and receives 411 an NAS authentication response from UE2. The AMF creates 412 an NAS security context for the additional NAS connection. The AMF transmits 413 an NAS security mode command to UE2, and receives 414 an NAS security mode complete message from UE2. The security mode command 413 may comprise an additional NAS security configuration comprising the selected NAS security algorithms and key set identifier, KSI, to be applied at the UE for NAS messages on the second NAS connection. However, if the NAS PDU is for a service request, then one or more of the steps 406-414 may be skipped.

The AMF then prepares 415 an initial context setup request with additional information indicating NAS signaling connection establishment accept, and transmits 416 the NGAP initial context setup request for UE2 to the gNB. The NGAP initial context setup request may comprise UE aggregate maximum bit rate (AMBR), globally unique AMF ID (GUAMI), PDU session setup information, UE internet protocol (IP) address, NAS PDU, single network slice selection assistance Information (S-NSSAI), allowed NSSAI, security key, UE security capabilities, etc., for UE2.

The gNB then creates 417 a new NAS context for UE2, generates 418 new keys and creates a new security context for UE2, creates 419 one or more DRBs and optionally one or more SRBs for UE2, links 420 the UE2 DRBs and SRBs to the UE2 security context, configures 421 UE-AMBR and slices to the UE2 DRBs and SRBs, and maps 422 the UE2 DRBs and SRBs, security context and NAS context on the substantially same RRC connection as UE1. The security context may comprise security keys, such as ciphering and integrity protection keys for RRC and user plane. For DRB, the security key set may be selected based on the association of DRB to the second NAS connection. For SRB, the key set may be based on the first NAS connection created within the RRC connection.

Further, the gNB transmits 423 an RRC reconfiguration comprising the additional DRBs and SRBs, additional security configuration and NAS PDU, for example registration accept, to the UE on the substantially same RRC connection. The security configuration may comprise security algorithms to be used by the UE for deriving security keys. For security configuration, an additional security mode command may be used instead of using RRC reconfiguration.

The UE then creates 424 new security keys for UE2 based on the additional security configuration, configures 425 the additional DRBs and SRBs for UE2, links 426 the additional DRBs and/or SRBs to the additional security context, applies 427 the NAS configuration and prepares registration complete. The UE transmits 428 an RRC reconfiguration complete message to the gNB indicating that the RRC reconfiguration is completed.

The gNB transmits 429 an initial context setup response to the AMF indicating that the additional NAS signaling connection establishment is complete. For example, the initial context setup response may be transmitted with cause: "additional NAS signaling connection establishment complete". The AMF may further indicate 430 the additional connection establishment to the AMF of UE1, i.e. AMF1.

Figure 5:
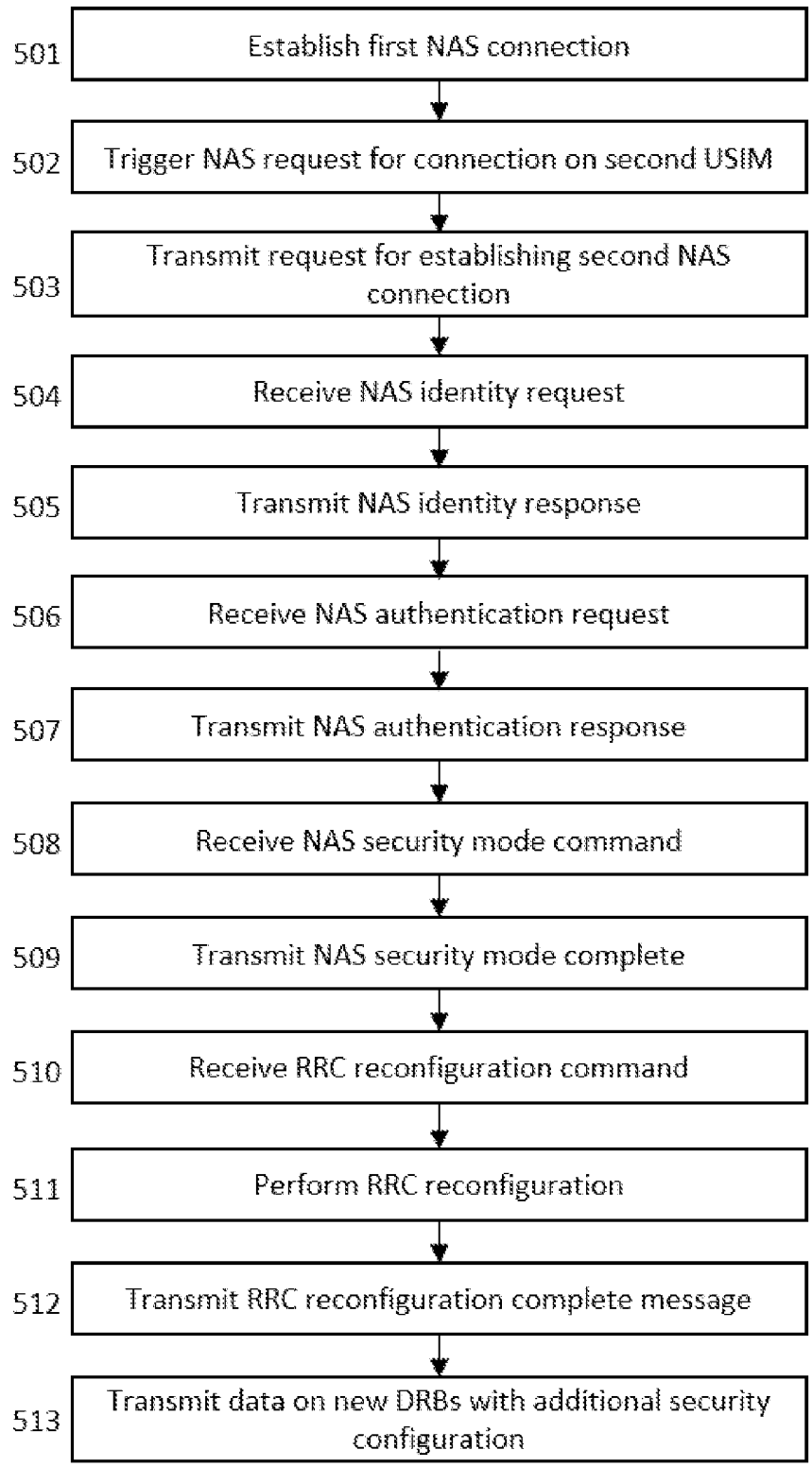
FIGS. 5-7 illustrate flow charts according to some exemplary embodiments.

FIG. 5 illustrates a flow chart according to an exemplary embodiment of an algorithm comprised in a UE for establishing a second NAS signalling connection for the second USIM over a single RRC connection shared with the first USIM. The UE may be, for example, a dual SIM dual active, DSDS, device.

Referring to FIG. 5, a first NAS connection to a first AMF for the first USIM is established 501 via an RRC connection between the UE and a base station, such as a gNB. A NAS request for establishing a second NAS connection on a second USIM is triggered 502. A request for establishing the second connection on the second USIM is transmitted 503 to the base station. The request is transmitted via the RRC connection associated with the pre-existing first NAS connection for the first USIM comprised in the UE. The request for establishing the second NAS connection may be transmitted, for example, in an RRC modification request message or in an RRC uplink transfer message with additional parameters indicating that the message is for creating a new UE context for the second NAS connection. A NAS identity request is received 504 from a second AMF. A NAS identity response is transmitted 505 to the second AMF. A NAS authentication request is received 506 from the second AMF. A NAS authentication response is transmitted 507 to the second AMF. A NAS security mode command is received 508 from the second AMF. A NAS security mode complete message is transmitted 509 to the second AMF. An RRC reconfiguration message indicating one or more additional DRBs to be configured, an additional security configuration and a NAS PDU is received 510 from the gNB via the RRC connection. Optionally, the RRC reconfiguration message may also comprise one or more SRBs to be configured for the second USIM. If SRBs are not present in the RRC reconfiguration message, the second NAS connection may use the SRBs of the first NAS connection. An RRC reconfiguration is performed 511 with the one or more additional DRBs for the second USIM using the additional security configuration. During the RRC reconfiguration 511, the UE creates new security keys for UE2 using the additional security configuration, configures the one or more additional DRBs (and SRBs) for UE2, links the one or more additional DRBs (and SRBs) to the additional security context for the second USIM, applies the NAS configuration, and prepares registration complete. The one or more SRBs may be linked to the security context of the first USIM or to the security context of the second USIM. An RRC reconfiguration complete message is then transmitted 512 to the gNB via the RRC connection, and data is transmitted 513 on the new DRBs with the additional security configuration.

Figure 6:
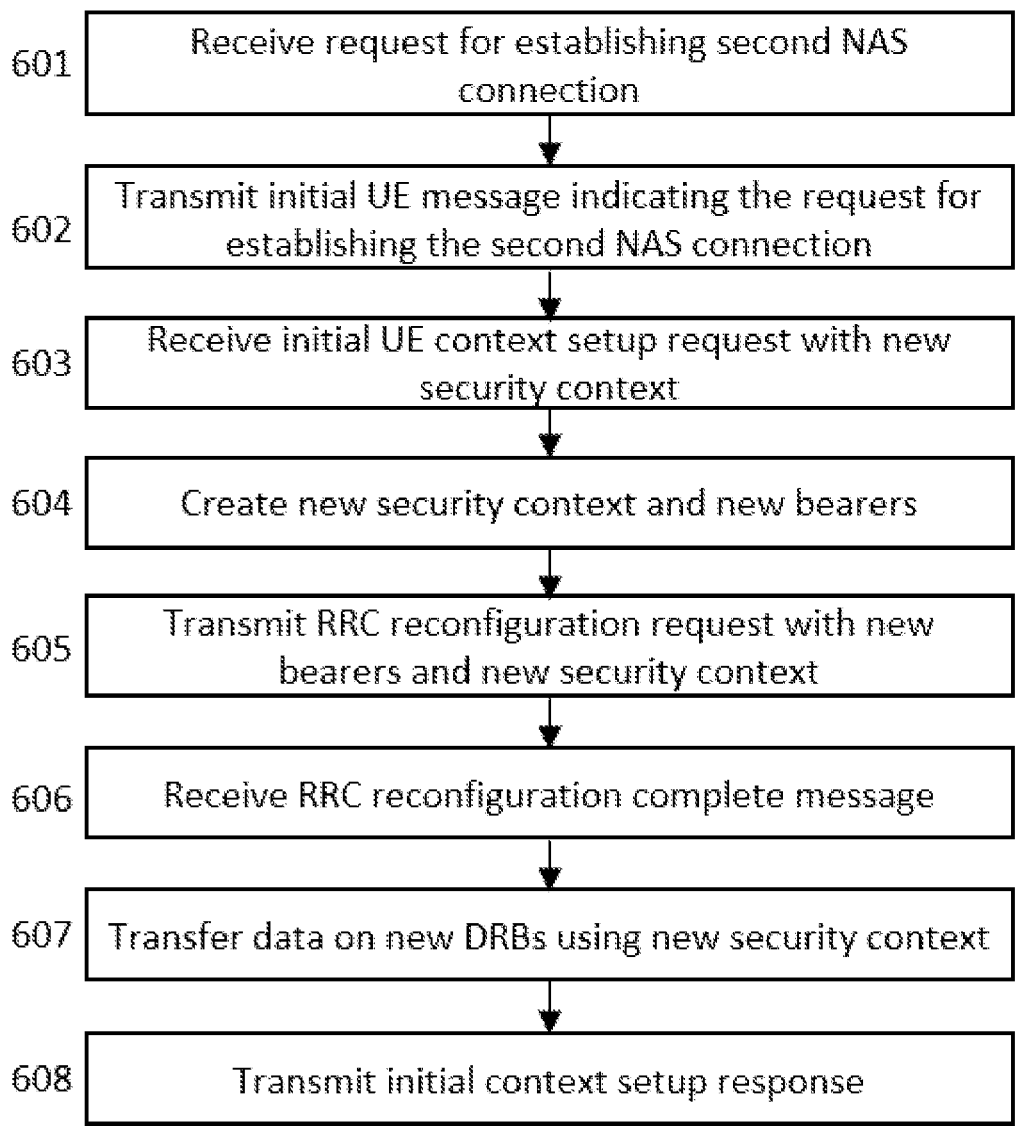

FIG. 6 illustrates a flow chart according to an exemplary embodiment of an algorithm comprised in a base station such as a gNB for establishing a second NAS signalling connection for the second USIM over a single RRC connection shared with the first USIM.

Referring to FIG. 6, a request for establishing the second NAS connection on the second USIM is received 601 from a UE. The request is received via an RRC connection associated with a pre-existing first NAS connection from a first USIM comprised in the UE. The request for establishing the second NAS connection may be received, for example, in an RRC modification request message or in an RRC uplink transfer message with additional parameters indicating that the message is for creating a new UE context for the second NAS connection. An NGAP initial UE message indicating the request for the second NAS connection establishment is transmitted 602 to a second AMF. An initial UE context setup request with a new security context is received 603 from the second AMF indicating an acceptance for establishing the second NAS connection. The new security context and one or more new DRBs and SRBs are created 604 for the second USIM. An RRC reconfiguration message indicating the one or more new DRBs and SRBs as well as the new security context to be configured is transmitted 605 to the UE via the RRC connection. It should be noted that creating the one or more SRBs for the second USIM and indicating them in the RRC reconfiguration message is optional. An RRC reconfiguration complete message is received 606 from the UE via the RRC connection indicating that the radio resource control reconfiguration is completed. Data is then transferred 607 on the new DRBs using the new security context. An initial context setup response is transmitted 608 to the second AMF indicating that the second NAS connection is established.

Figure 7:
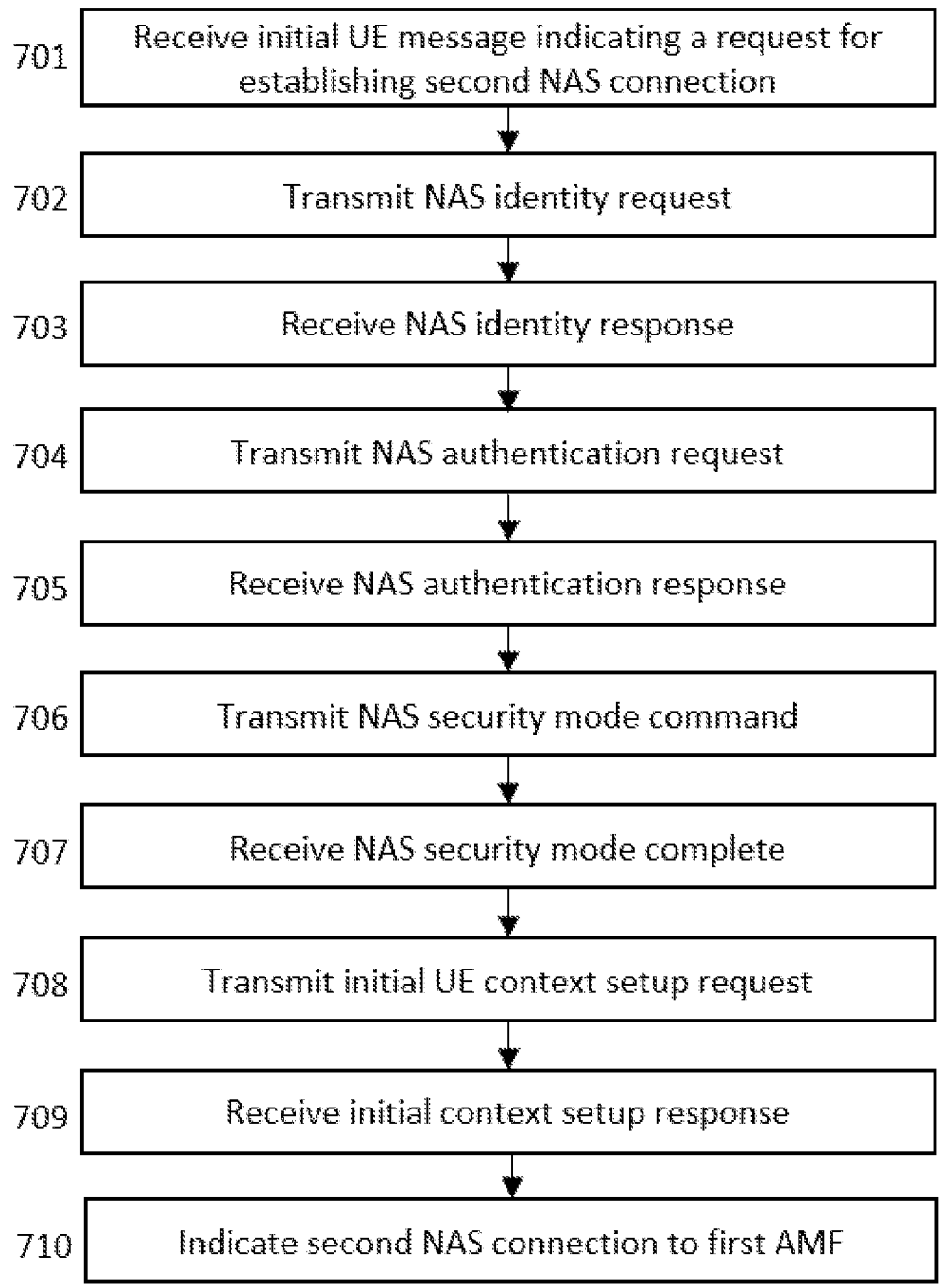

FIG. 7 illustrates a flow chart according to an exemplary embodiment of an algorithm comprised in a second AMF for establishing a second NAS signalling connection for the second USIM over a single RRC connection shared with the first USIM.

Referring to FIG. 7, an NGAP initial UE message indicating the request for the second NAS connection establishment is received 701 from a base station such as a gNB. A NAS identity request is transmitted 702 to the UE. A NAS identity response is received 703 from the UE. A NAS authentication request is transmitted 704 to the UE. A NAS authentication response is received 705 from the UE. A NAS security mode command is transmitted 706 to the UE. A NAS security mode complete message is received 707 from the UE. An NGAP initial UE context setup request with a new security context is transmitted 708 to the gNB indicating an acceptance for establishing the second NAS connection. An initial context setup response is received 709 from the gNB indicating that the second NAS connection is established. The establishment of the second NAS connection is indicated 710 to a first AMF, which is used for the first NAS connection on the first USIM.

Figure 8:
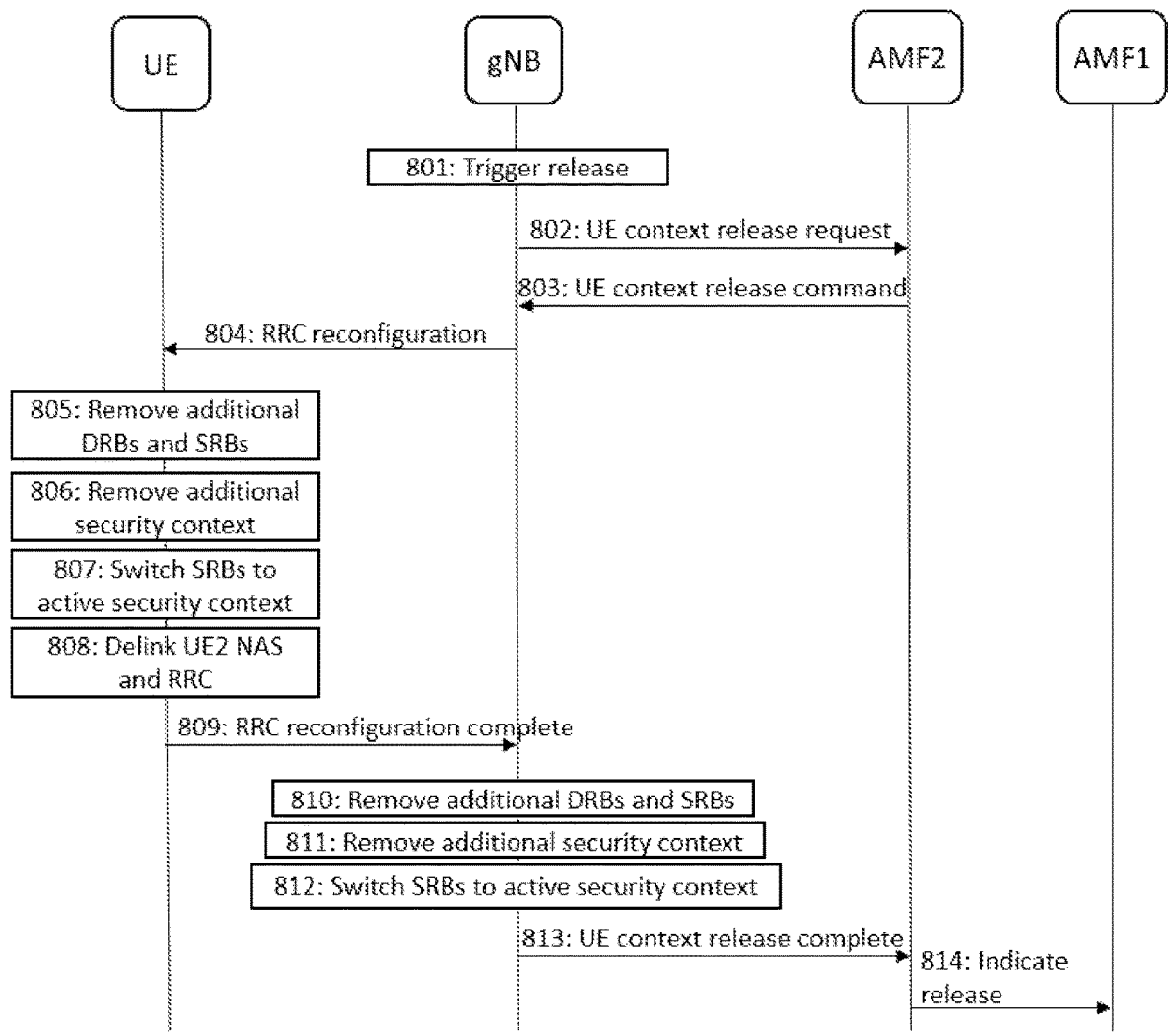
FIG. 8 illustrates a signaling diagram according to an exemplary embodiment.

FIG. 8 illustrates a signaling diagram according to an exemplary embodiment for releasing a NAS connection for one USIM, when there are two or more NAS connections mapped over a single RRC connection.

Referring to FIG. 8, a decision to release the second NAS connection is triggered 801 in the base station, such as a gNB. The gNB transmits 802 an NGAP UE context release request to the second AMF, i.e. AMF2, indicating a request to release the second NAS connection. For example, the UE context release request may be transmitted with cause: "additional connection release request" indicating the reason for the release request. The gNB receives 803 an NGAP UE context release command from the second AMF indicating a command for releasing the additional connection and the UE context. For example, the UE context release command may be transmitted with cause: "additional connection release command". The gNB transmits 804 an RRC reconfiguration message to the UE, wherein the RRC reconfiguration message comprises a list of the additional DRBs, SRBs, and the security context corresponding to UE2 to be deleted.

The UE then removes 805 the additional DRBs and SRBs indicated by the RRC reconfiguration message. The UE further removes 806 the additional security context for the released UE2. The UE may also switch 807 the SRBs to the active UE security context, i.e. to the security context associated with the first USIM. In other words, the SRB keys may be switched to another key set, and the RRC connection is reconfigured rather than released. The UE further delinks 808 the UE2 NAS and RRC, and the UE2 NAS moves to a mobility management idle state, MM-IDLE. The UE transmits 809 an RRC reconfiguration complete message to the gNB on the RRC connection indicating completion of the requested RRC reconfiguration.

The gNB removes 810 the additional DRBs and SRBs. The gNB further removes 811 the additional security context, NAS context, slice info, and other configurations of the released UE2, and switches 812 the SRBs to the active UE security context, i.e. to the security context of the first USIM. The gNB transmits 813 an NGAP UE context release complete message to the second AMF indicating that the release of the second connection is completed. For example, the UE context release complete message may be transmitted with cause: "additional connection release complete". The NGAP UE context release complete message may also comprise an indication to the second AMF that another NAS connection, i.e. the first NAS connection, to the AMF of UE1 is active. The second AMF may indicate 814 to the AMF of UE1, i.e. AMF1, that the second connection is released.

Figure 9:
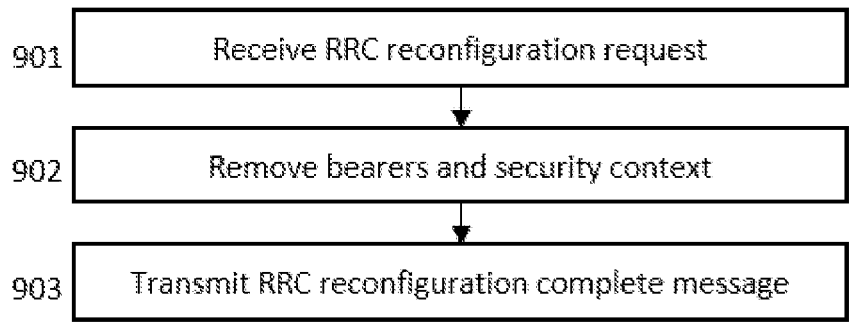
FIGS. 9-11 illustrate flow charts according to some exemplary embodiments.

FIG. 9 illustrates a flow chart according to an exemplary embodiment of an algorithm comprised in a UE for releasing the second NAS connection for the second USIM. Referring to FIG. 9, an RRC reconfiguration message indicating a command to remove the one or more DRBs, one or more SRBs, and security context associated with the second USIM is received 901 from a base station, such as a gNB. The indicated DRB(s), SRB(s), and security context associated with the second USIM are then removed 902. An RRC reconfiguration complete message is transmitted 903 to the base station indicating that the RRC reconfiguration is completed.

Figure 10:
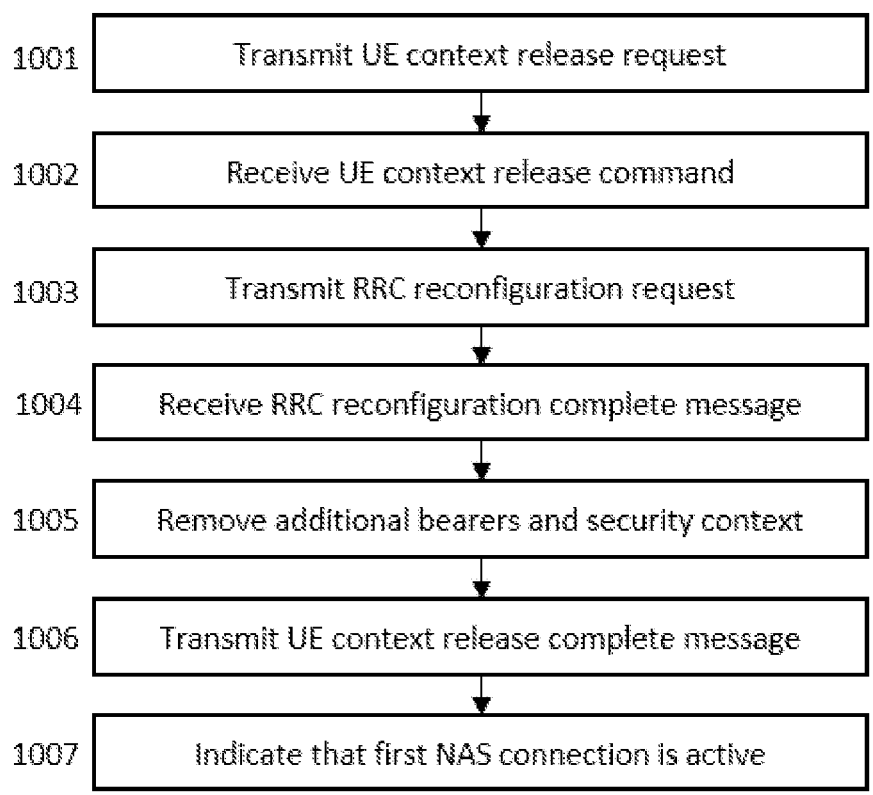

FIG. 10 illustrates a flow chart according to an exemplary embodiment of an algorithm comprised in a base station such as a gNB for releasing the second NAS connection for the second USIM. Referring to FIG. 10, an NGAP UE context release request indicating a request to release the second NAS connection is transmitted 1001 to the second AMF. An NGAP UE context release command indicating a command for releasing the second NAS connection is received 1002 from the second AMF. An RRC reconfiguration message indicating a command to remove the one or more DRBs, one or more SRBs and security context associated with the second USIM is transmitted 1003 to the UE. An RRC reconfiguration complete message indicating that the RRC reconfiguration is complete is received 1004 from the UE. The indicated DRBs and security context are removed 1005. An NGAP UE context release complete message indicating that the second NAS connection is released is transmitted 1006 to the second AMF. An indication that a first NAS connection associated with a first AMF is active may also be indicated 1007 to the second AMF.

Figure 11:
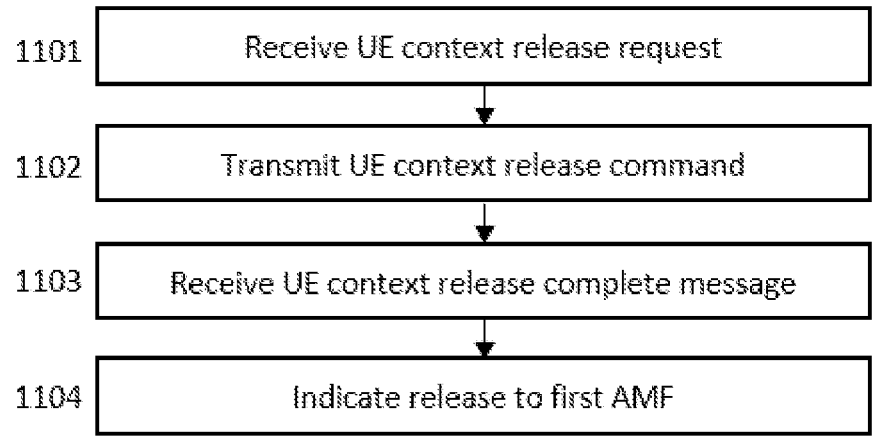

FIG. 11 illustrates a flow chart according to an exemplary embodiment of an algorithm comprised in the second AMF for releasing the second NAS connection for the second USIM. Referring to FIG. 11, an NGAP UE context release request indicating a request to release the second NAS connection is received 1101 from a base station such as a gNB. An NGAP UE context release command indicating a command for releasing the second NAS connection is transmitted 1102 to the base station. An NGAP UE context release complete message indicating that the second NAS connection is released is received 1103 from the base station. The NGAP UE context release complete message may also comprise an indication that a first NAS connection associated with a first AMF is active. The release of the second NAS connection may be indicated 1104 to the first AMF.

The functions and/or blocks described above by means of FIGS. 4-11 are in no absolute chronological order, and some of them may be performed simultaneously or in an order differing from the described one. Other functions and/or blocks may also be executed between them or within them.

Figure 12:
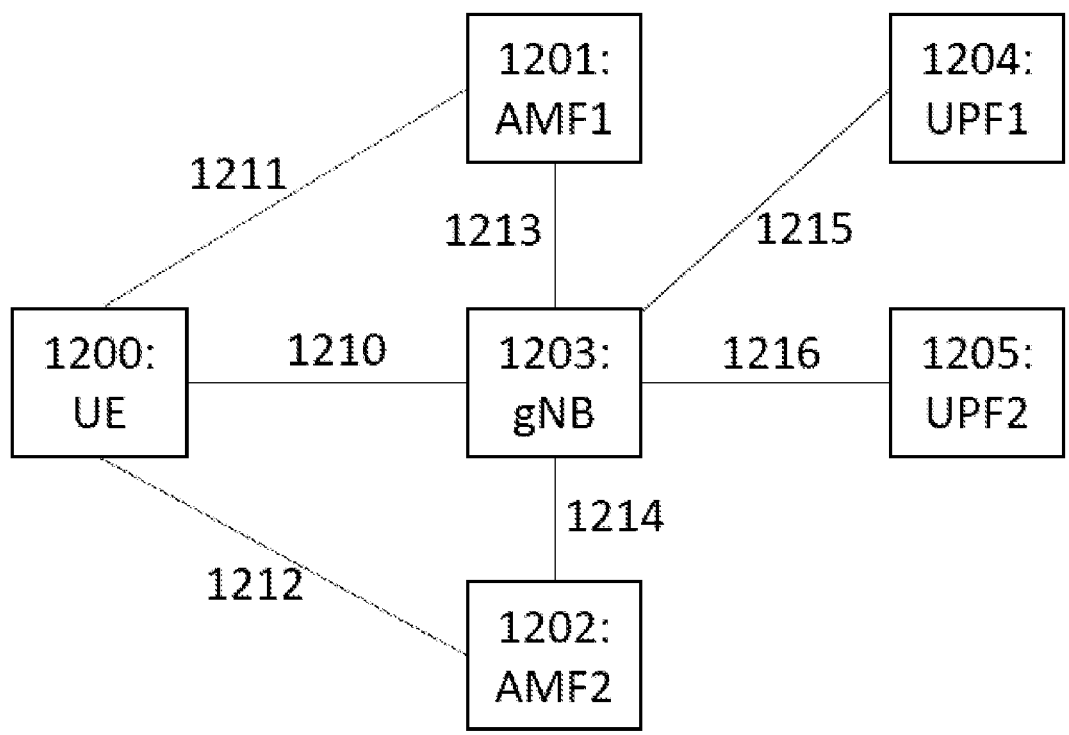
FIG. 12 illustrates a simplified architecture of a system according to an exemplary embodiment.

FIG. 12 illustrates a system according to an exemplary embodiment. A MUSIM UE 1200 comprises two UE protocol stacks UE1 and UE2 associated with a first USIM and a second USIM, respectively, having two NAS signalling connections. From the UE 1200, there is a single RRC connection over a Uu interface 1210 towards a gNB 1203, which manages connections to two different core network functional entities, i.e. AMF and user plane function, UPF, for UE1 and UE2. The UE 1200 is connected to a first AMF 1201 over a first N1 logical interface 1211 for UE1, and to a second AMF 1202 over a second N1 logical interface 1212 for UE2. The gNB 1203 is connected to the first AMF 1201 over a first N2 interface 1213, and the gNB 1203 is connected to the second AMF 1202 over a second N2 interface 1214. N1 is for the NAS protocol between the AMF and the UE, while N2 is an NGAP protocol network interface for control plane signalling between the AMFs and the gNB. On the data plane, UE1 is connected to a first UPF 1204 via the gNB 1203 over a first N3 interface 1215, and UE2 is connected to a second UPF 1205 via the gNB 1203 over a second N3 interface 1216.

It should be noted that the second AMF and the second UPF may also be the substantially same as the first AMF and the first UPF, in which case there may be two logical connections for UE1 and UE2 over the substantially same physical path.

An AMF may be responsible for managing handovers between base stations such as gNBs within the RAN. Such handovers may be referred to as X2 or Xn handovers. For mobility scenarios of X2/Xn based mobility, in some exemplary embodiments the target node may trigger an independent path switch procedure to inform the AMF (or MME) about switching of both NAS connections. In case of NG/S1 based mobility, additional information may be provided to the core network to update the mobility of the two independent contexts.

FIG. 13 illustrates a flow chart according to an exemplary embodiment, wherein an AMF receives 1301, from a second base station, a handover indication for switching the first non-access stratum connection and the second non-access stratum connection from a first base station to the second base station.

A technical advantage provided by some exemplary embodiments may be that a terminal device with a single transmitter and receiver may be enabled to support service and/or slices from multiple USIMs simultaneously, when they are in a single, or shared, PLMN. In other words, a dual transmitter and receiver capability may not be needed for multi-SIM DSDA operation. Furthermore, some exemplary embodiments may also be beneficial for DSDA devices, as the use of separate PS instances in a single serving cell may not be efficient from UE and gNB point of view.

FIG. 14 illustrates an apparatus 1400, which may be an apparatus such as, or comprised in, a terminal device, according to an exemplary embodiment. A terminal device may also be referred to as a UE herein. The apparatus 1400 comprises a processor 1410. The processor 1410 interprets computer program instructions and processes data. The processor 1410 may comprise one or more programmable processors. The processor 1410 may comprise programmable hardware with embedded firmware and may, alternatively or additionally, comprise one or more application specific integrated circuits, ASICs.

The processor 1410 is coupled to a memory 1420. The processor is configured to read and write data to and from the memory 1420. The memory 1420 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1420 stores computer readable instructions that are executed by the processor 1410. For example, non-volatile memory stores the computer readable instructions and the processor 1410 executes the instructions using volatile memory for temporary storage of data and/or instructions.

The computer readable instructions may have been pre-stored to the memory 1420 or, alternatively or additionally, they may be received, by the apparatus, via an electromagnetic carrier signal and/or may be copied from a physical entity such as a computer program product. Execution of the computer readable instructions causes the apparatus 1400 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1400 may further comprise, or be connected to, an input unit 1430. The input unit 1430 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1430 may comprise an interface to which external devices may connect to.

The apparatus 1400 may also comprise an output unit 1440. The output unit may comprise or be connected to one or more displays capable of rendering visual content such as a light emitting diode, LED, display, a liquid crystal display, LCD and a liquid crystal on silicon, LCoS, display. The output unit 1440 may further comprise one or more audio outputs. The one or more audio outputs may be for example loudspeakers.

The apparatus 1400 further comprises a connectivity unit 1450. The connectivity unit 1450 enables wireless connectivity to one or more external devices. The connectivity unit 1450 comprises at least one transmitter and at least one receiver that may be integrated to the apparatus 1400 or that the apparatus 1400 may be connected to. The at least one transmitter comprises at least one transmission antenna, and the at least one receiver comprises at least one receiving antenna. The connectivity unit 1450 may comprise an integrated circuit or a set of integrated circuits that provide the wireless communication capability for the apparatus 1400. Alternatively, the wireless connectivity may be a hardwired application specific integrated circuit, ASIC. The connectivity unit 1450 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1400 may further comprise various components not illustrated in FIG. 14. The various components may be hardware components and/or software components.

The apparatus 1500 of FIG. 15 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1500 may be an electronic device comprising one or more electronic circuitries. The apparatus 1500 may comprise a communication control circuitry 1510 such as at least one processor, and at least one memory 1520 including a computer program code (software) 1522 wherein the at least one memory and the computer program code (software) 1522 are configured, with the at least one processor, to cause the apparatus 1500 to carry out some of the exemplary embodiments described above.

The memory 1520 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1500 may further comprise a communication interface 1530 comprising hardware and/or software for realizing communication connectivity according to one or more communication protocols. The communication interface 1530 may provide the apparatus with radio communication capabilities to communicate in the cellular communication system. The communication interface may, for example, provide a radio interface to terminal devices. The apparatus 1500 may further comprise another interface towards a core network such as the network coordinator apparatus and/or to the access nodes of the cellular communication system. The apparatus 1500 may further comprise a scheduler 1540 that is configured to allocate resources.

As used in this application, the term "circuitry" may refer to one or more or all of the following:
a. hardware-only circuit implementations (such as implementations in only analog and/or digital circuitry) and
b. combinations of hardware circuits and software, such as (as applicable):
  i. a combination of analog and/or digital hardware circuit(s) with software/firmware and
  ii. any portions of hardware processor(s) with software (including digital signal processor(s)), software, and memory(ies) that work together to cause an apparatus, such as a mobile phone, to perform various functions) and
c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:
   transmit, to a base station, a request for establishing a second non-access stratum connection for a second universal subscriber identity module, wherein the request is transmitted via a radio resource control connection associated with a pre-existing first non-access stratum connection for a first universal subscriber identity module;

receive, from the base station, a first radio resource control reconfiguration message indicating one or more data radio bearers to be configured, wherein the first radio resource control reconfiguration message is received via the radio resource control connection;

configure the one or more data radio bearers for the second universal subscriber identity module;

transmit, to the base station, a first radio resource control reconfiguration complete message indicating that the first radio resource control reconfiguration is completed-;

configure one or more signalling radio bearers for the second universal subscriber identity module, wherein the first radio resource control reconfiguration message further indicates the one or more signalling radio bearers to be configured;

create one or more security key sets for the one or more data radio bearers and the one or more signalling radio bearers based at least partly on a security configuration received from the base station; and link the one or more data radio bearers and the one or more signalling radio bearers to a security context associated with the second universal subscriber identity module.

2. An apparatus according to claim 1, wherein the apparatus is comprised in a terminal device.

3. An apparatus according to claim 1, wherein the at least one memory and computer program code are configured, with the at least one processor, to cause the apparatus at least to receive, from an access and mobility management function, a non-access stratum security mode command comprising a non-access stratum security configuration for the second non-access stratum connection.

4. An apparatus according to claim 1, wherein the at least one memory and computer program code are configured, with the at least one processor, to cause the apparatus at least to switch the security context of the one or more signaling radio bearers to a security context associated with the first universal subscriber identity module.

5. An apparatus comprising at least one processor, and at least one memory including computer program code, wherein the at least one memory and the computer program code are configured, with the at least one processor, to cause the apparatus to:

transmit, to a base station, a request for establishing a second non-access stratum connection for a second universal subscriber identity module, wherein the request is transmitted via a radio resource control connection associated with a pre-existing first non-access stratum connection for a first universal subscriber identity module;

receive, from the base station, a first radio resource control reconfiguration message indicating one or more data radio bearers to be configured, wherein the first radio resource control reconfiguration message is received via the radio resource control connection;

configure the one or more data radio bearers for the second universal subscriber identity module;

transmit, to the base station, a first radio resource control reconfiguration complete message indicating that the first radio resource control reconfiguration is completed;

receive, from a base station, a second radio resource control reconfiguration message indicating a command to remove at least the one or more data radio bearers associated with the second universal subscriber identity module;

remove at least the one or more data radio bearers associated with the second universal subscriber identity module; and transmit, to the base station, a second radio resource control reconfiguration complete message indicating that the second radio resource control reconfiguration is completed.

6. An apparatus comprising at least one processor, and at least one memory including computer program code, wherein the at least one memory and the computer program code are configured, with the at least one processor, to cause the apparatus to:

receive, from a first base station, a request for establishing a second non-access stratum connection from a second universal subscriber identity module comprised in a terminal device;

transmit, to the first base station, an initial context setup request indicating an acceptance for establishing the second non-access stratum connection;

receive, from the first base station, an initial context setup response indicating that the second non-access stratum connection is established;

indicate to a first access and mobility management function that the second non-access stratum connection is established, wherein the first access and mobility management function is associated with an active first non-access stratum connection from a first universal subscriber identity module comprised in the terminal device; and wherein the apparatus comprises a second access and mobility management function.

7. An apparatus according to claim 6, wherein the at least one memory and computer program code are configured, with the at least one processor, to cause the apparatus at least to:

receive, from the first base station, a release request message indicating a request to release the second non-access stratum connection;

transmit, to the first base station, a release command indicating a command to release the second non-access stratum connection;

receive, from the first base station, a release complete message indicating that the second non-access stratum connection is released.

8. An apparatus according to claim 6, wherein the at least one memory and computer program code are configured, with the at least one processor, to cause the apparatus at least to indicate to the first access and mobility management function that the second non-access stratum connection is released;

wherein the release complete message further comprises an indication that the first non-access stratum connection associated with the first access and mobility management function is active.

9. An apparatus according to claim 6, wherein the at least one memory and computer program code are configured, with the at least one processor, to cause the apparatus at least to receive, from a second base station, a handover indication for switching the first non-access stratum connection and the second non-access stratum connection from the first base station to the second base station.

* * * * *